(12) United States Patent
Ho

(10) Patent No.: US 12,253,370 B1
(45) Date of Patent: Mar. 18, 2025

(54) TRAVEL TIME ESTIMATION SYSTEM

(71) Applicant: Waye, LLC, Woodinville, WA (US)

(72) Inventor: William P. C. Ho, Woodinville, WA (US)

(73) Assignee: WAYE, LLC, Woodinville, WA (US)

( * ) Notice: Subject to any disclaimer, the term of this patent is extended or adjusted under 35 U.S.C. 154(b) by 0 days.

(21) Appl. No.: 18/671,530

(22) Filed: May 22, 2024

(51) Int. Cl.
*G01C 21/00* (2006.01)
*G01C 21/34* (2006.01)

(52) U.S. Cl.
CPC .................... *G01C 21/343* (2013.01)

(58) Field of Classification Search
CPC ........................................................ G01C 21/343
See application file for complete search history.

(56) References Cited

U.S. PATENT DOCUMENTS

| | | | |
|---|---|---|---|
| 10,094,676 B1 | 10/2018 | Ho | |
| 2011/0320118 A1* | 12/2011 | Ho | G01C 21/3407 701/465 |
| 2013/0013202 A1* | 1/2013 | Som | G09B 29/106 701/532 |
| 2013/0204528 A1* | 8/2013 | Okude | G01C 21/3492 701/533 |
| 2013/0345969 A1* | 12/2013 | Udeshi | H04W 4/023 701/461 |
| 2016/0223355 A1* | 8/2016 | Habib | G01C 21/3492 |
| 2017/0336219 A1* | 11/2017 | Di Lorenzo | G01C 21/3453 |

\* cited by examiner

*Primary Examiner* — Khoi H Tran
*Assistant Examiner* — Tien Minh Le
(74) *Attorney, Agent, or Firm* — Perkins Coie LLP

(57) ABSTRACT

A travel time estimation system receives trip requests including pair of addresses and a desired time of travel. A processor is programmed to convert the addresses into grid points (Encoded Addresses—EAs) in an array of regularly spaced grid points in a Cartesian Coordinate system. The processor reads a record associated with the EA's to determine a covering grid point (Unique Encoded Address—UEA) associated with each EA, where the associated UEA is located no more than a predetermined maximum distance away from the EA. The processor accesses a second record associated with the pair of UEAs that references a location in a memory that stores estimated travel times between the UEAs at one or more requested trip times. The stored travel time between the UEAs at a time that closest matches the desired time of travel is returned by the processor as the estimated travel time between the addresses provided to the travel time estimation system.

9 Claims, 6 Drawing Sheets

Diagram of Data Structure

Matrix of (from-UAE x to-UAE) for DataSet 1

| fm\to | 1 | 2 | 3 | 4 | 5 | 6 | 7 | 8 | 9 | 10 | ... | 5,646 |
|---|---|---|---|---|---|---|---|---|---|---|---|---|
| 1 | | | | | | | | | | | | |
| 2 | | | | | | | | | | | | |
| 3 | | 8 | | | | | | | | | | |
| 4 | | | 11 | | | | 5 | | | | | |
| 5 | | | | | | | x | x | | | | |
| 6 | | | | | | | | x | | | | |
| 7 | | | | x | | x | | | | | | |
| 8 | | | | | | | | | x | | | |
| 9 | | | | | | | | | | x | | |
| 10 | | | | | | | | | x | | | |
| ... | | | | | | | | | | | | |
| 5,646 | | | | | | | | | | | | |

Common Storage of [hour, travel-time]

| | hr | trv | |
|---|---|---|---|
| 1 | 7:00 | 7 min | |
| 2 | 8:00 | 10 min | |
| 3 | 13:00 | 12 min | |
| 4 | 0 | -1 | delimiter |
| 5 | 10:00 | 40 min | |
| 6 | 11:00 | 37 min | |
| 7 | 0 | -1 | delimiter |
| 8 | 15:00 | 15 min | |
| 9 | 16:00 | 15 min | |
| 10 | 0 | -1 | delimiter |
| 11 | 7:00 | 22 min | |
| 12 | 0 | -1 | delimiter |
| ... | | | |
| 2454486 + | 0 | -1 | delimiter |

Fig 5

TRAVEL TIME ESTIMATION SYSTEM

TECHNICAL FIELD

The disclosed technology relates to systems and methods for estimating travel times between locations.

BACKGROUND

Para-transit service is an on-demand service mandated by the Americans with Disabilities Act (ADA) that was passed into law on Jul. 26, 1990. The ADA provides a subsidized, zero-denial, door-to-door service to the elderly and handicapped for daily mobility. Qualified and registered clients typically call in trip requests up to 7 days in advance, for anywhere to anywhere in a service area. The requests are either pick-anchored ("I want to be picked up at 10:00 AM") or drop-anchored ("My Doctor's appointment is at 10:30 AM"). Each client is given a promised pick time window of 30 minutes [Pick-time, Pick-time+30 minutes]. For appointments, an additional requirement is that the client must be dropped off at the appointment address in a time window of 30 minutes [Appointment-time−30 minutes, Appointment-time]. There may be variations in this model. For example, clients may be limited to call in trip requests up to 3 days in advance.

At some time before the day of service, all of the requested trips are batch optimized into routes for a mixed service fleet of vans and sedans, each of which is equipped with a fixed number of wheelchair and ambulatory seats. For example, it is not uncommon that a scheduling system has to schedule over 27,000 daily trip requests onto 2,700 or fewer routes (driver shift and vehicle) subject to a multitude of constraints. These constraints can include factors such as: making pick-ups and drop-offs within each trip's requested 30-minute pickup window and/or appointment window, not exceeding a maximum onboard ride time for each passenger (Maximum Ride Time), not exceeding a vehicle's ambulatory and wheelchair seating capacities, meeting wheelchair LIFO loading and unloading, meeting driver shift start and end times, enforcing different travel speeds by time period of day, using different speeds in different geographic speed regions or zones, and so on.

Scheduling the routes requires the system to calculate an expected travel time between candidate pairs of addresses in the trip request set in order to determine if they can correctly and efficiently be made adjacent stops on a route in a schedule. Travel speeds vary by time period of day (e.g. rush hours or typical congestion, school zones etc.) as well as geographically by law, such as the maximum speed permitted in a geographic region (e.g. speed regions or speed zones), which add more variables to travel time calculations.

The following is a brief description of two known methods of estimating travel time between two locations.

Triangulation/Pythagorean Travel Time Calculation Method

A common travel time prediction method first calculates the distance between two addresses (X1, Y1; X2, Y2) by triangulation ($|X2-X1|+|Y2-Y1|$) or by Pythagorean theorem ($SQRT(|X2-X1|^2+|Y2-Y1|^2)$). The travel time is then calculated as distance divided by speed-Time=Distance/Speed. There are complexities added to calculations to reflect real-world conditions. One is to define speed regions as polygons partitioning a service region, each with an associated table of speeds by time period of day. One speed region might correspond to a city center, with a 6 miles per hour average speed in the morning rush hour between 6:30 and 10:30, 5.5 miles per hour average speed in the evening rush hour between 16:00 and 18:30, and 10 miles per hour average in the off rush hour periods. Calculations must account for addresses being in different speed regions, crossing rivers on bridges, going around barriers, and so on.

GIS System Travel Time Calculation Method

Another approach is to use a GIS representation of a street network, with a speed by time of day associated with each street segment. The distance and travel time between two addresses is calculated by applying a route algorithm such as Dijkstra's algorithm or the A* algorithm, which produces a turn-by-turn route that takes the shortest travel time between the addresses through the network of street segments. At each point during the calculation, the travel time to reach that node location (corresponding to a street intersection) from the origin address is known. This method is many times slower than the triangulation/Pythagorean theorem method, even with real-world complexities added. There are many times more computations required for one path, before adding the branching across a spreading network of street segments that must evaluate many more candidate paths.

As will be appreciated, to practically determine a number of route schedules for a day's trip requests requires a computing device. In most systems, ride requests can be received up to 7 p.m. the day before. Confirmation of the rides is usually sent electronically or by a telephone messaging system at 9 p.m. the day before so there is generally about 2 hours for a computer to determine the routes for the next day's trips including any adjustments that are made manually. Empirically it has been measured that between 140,000,000-200,000,000 travel time estimations are required in order to batch schedule a set of 27,000 trip requests. Assuming a human expert can do 1 travel time estimation per second, the time to complete 140,000,000-200,000,000 calculations in a batch schedule would be between 38,888 and 55,555 hours-far longer than the time available to complete the schedules. Thus, route planning with travel time calculations is an impossible task for a human expert or a team of human experts to undertake in a paratransit demand-response service model.

Even with a computer, the travel time estimations take the bulk of the processing time for a scheduling system. One faster way of estimating travel times between locations is described in U.S. Pat. No. 10,094,676 (by the same inventor and herein incorporated by reference in its entirety). The '676 patent describes a disk-based representation in which all addresses in the paratransit demand-response service model are contained in one of a minimal set of disks of ¼ mile radius or smaller if the geographic area encompassed by the disk abuts a man-made or natural obstacle. The travel times between pairs of disks, by time period of day are stored in memory that is accessible by the scheduling system. At 15 miles per hour, the travel time for ¼ mile is 1 minute, so the average travel time between any two addresses in a geographic area included in the same disk is approximately 1 minute (2 minutes maximum if located on opposite sides of a disk and 0 minutes minimum if located at exactly the same location). The travel time between an address-pair in different disks (address 1 in disk 1 and address 2 in disk 2) has an average variation of 2 minutes.

Given the natural variability of travel times on the day of service-traffic congestion, traffic lights, the time clients take to enter or exit the vehicle, weather conditions, visibility, etc., predicting travel times with up to 2-minute variation is sufficiently accurate for the scheduling system to construct the schedules for the next day. The disk radius can be increased or decreased from ¼ mile to control the magnitude of the travel time variation or to increase or decrease the average variation in travel times.

Travel times by time period of day are stored for each disk-pair for the service to return the expected travel time for any time of day for any pair of addresses in which address 1 lies in disk 1, and address 2 lies in disk 2. Note that travel time for disk-pair (D1, D2, time of day) is not the same as travel time for disk-pair (D2, D1, same time of day) due to directionality of travel. For example, traveling from home to the office at 8:00 am in the morning rush hour is much slower than traveling from the office to home at that same 8:00 am time.

Despite the speed improvement provided by the methods described in the '676 patent, a number of calculations still need to be performed for each trip request. For a travel time request between a candidate address-pair at a specific time of day, the method must identify the corresponding disk-pair containing the from-address and the to-address.

One method to identify which disk contains an address A is to identify a 1-mile×1-mile grid area that address A lies in. Each grid area has an associated list of disks that overlap the grid area. Address A must lie in one or more of these disks. Each disk has a vertex or center. The disk whose vertex is closest to address A is identified by calculating the distance between address A and each associated disk's vertex.

For a service area site in the Northeast United States, each square mile area has an average of 5 associated disks. Identifying the disk-pair (D1, D2, time period) for a candidate pair of addresses at a particular time of day, requires an average of 10 calculations of (address, vertex) distance. While this method is measurably faster than the Triangulation/Pythagorean travel time calculation methods and is many times faster than the GIS System travel time calculation method, techniques to further improve processing speed are desirable.

SUMMARY

As will be discussed in further detail below, the disclosed technology is an improvement to the techniques described in the '676 patent for estimating the travel time between address pairs in a geographic region. With the disclosed techniques, a computer system or programmed processor maps an address to a nearest point in a grid of regularly spaced points in a Cartesian (x,y) coordinate space. In one embodiment, the grid point to which an address is mapped is determined by determining offsets of the address's precise latitude/longitude relative to a latitude/longitude of a designated origin point in a service area. The offsets in latitude/longitude are then converted into distance (e.g. miles or kilometers) and rounded up or down to a value equal to a desired distance between grid points or the resolution of the grid. In one embodiment, the rounded x and y distances are concatenated to form an identifier that specifies the particular grid point that is mapped to the address.

Each grid point in the service area to which an address of a requested trip has been mapped is associated with a single unique grid point (which may be itself) where the distance between all grid points associated with the unique grid point is less than some predetermined maximum. In one embodiment, each grid point is located within 0.2 miles of its associated unique grid point. A computer system stores a record of which unique grid point is associated with each mapped grid point.

The computer system also stores a record of the previously estimated or measured travel times between unique grid points. Because each grid point that is associated with its corresponding unique grid point is within a predetermined maximum distance from the unique grid points, the estimated travel time between any grid points associated with two different unique grid points is about the same as the travel time between the unique grid points. In one embodiment, the computer stores a pointer or index into a computer memory for each pair of unique grid points between which a travel time has been determined. The pointer or index indicates where an estimated or measured travel time between the unique grid points is stored in the computer memory.

BRIEF DESCRIPTION OF THE DRAWINGS

FIG. 5 illustrates one embodiment of how estimated travel times between unique grid points are stored in a computer memory.

DETAILED DESCRIPTION

As will be described in detail below, the disclosed technology reduces and simplifies the calculations required to associate an address of a trip request with a point used to estimate travel times in a service area. In one implementation, calculations are performed on integers to further improve computation speeds and travel times are efficiently stored to minimize memory usage and to improve access speed. The disclosed techniques have been measured to be 16 times faster than the disk-based travel time estimation methods described in U.S. Pat. No. 10,094,676.

Figure 1:
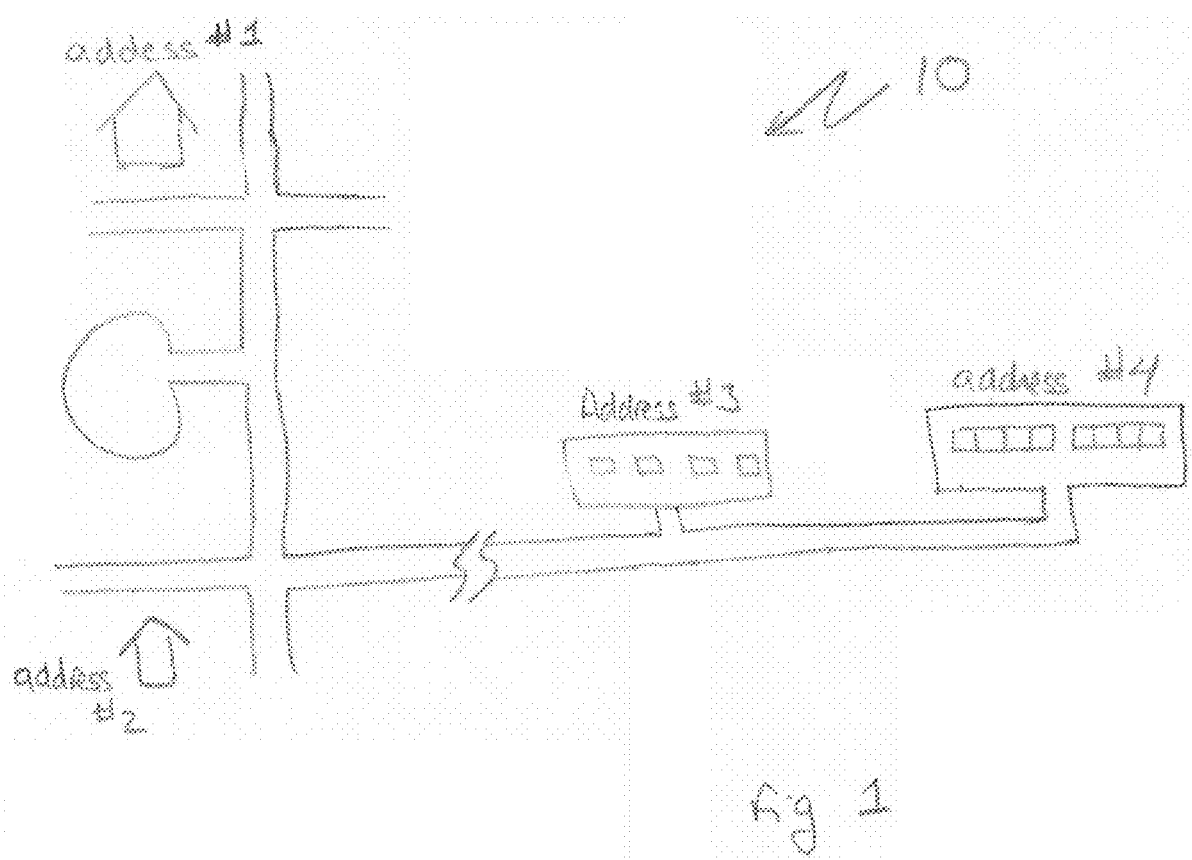
FIG. 1 shows a simplified map of a service area with a number of addresses corresponding to trip requests.

FIG. 1 illustrates a simplified service area 10 in which users can call in or enter trip requests for ride service. In the example shown, a first user at home address #1 may request a ride at 9:00 am to a clinic at address #3. Similarly, a second user may request a ride at 9:15 am on the same day from home address #2 to a community center at address #4. In order to determine a route for one or more vehicles to service the ride requests, a scheduling system estimates the travel times between all the various addresses of the ride requests (in both directions). As will be appreciated, the number of travel time estimations that must be made increases dramatically with each new ride request received and therefore constitutes a significant part of the computational time required to determine a day's schedules.

Figure 2:
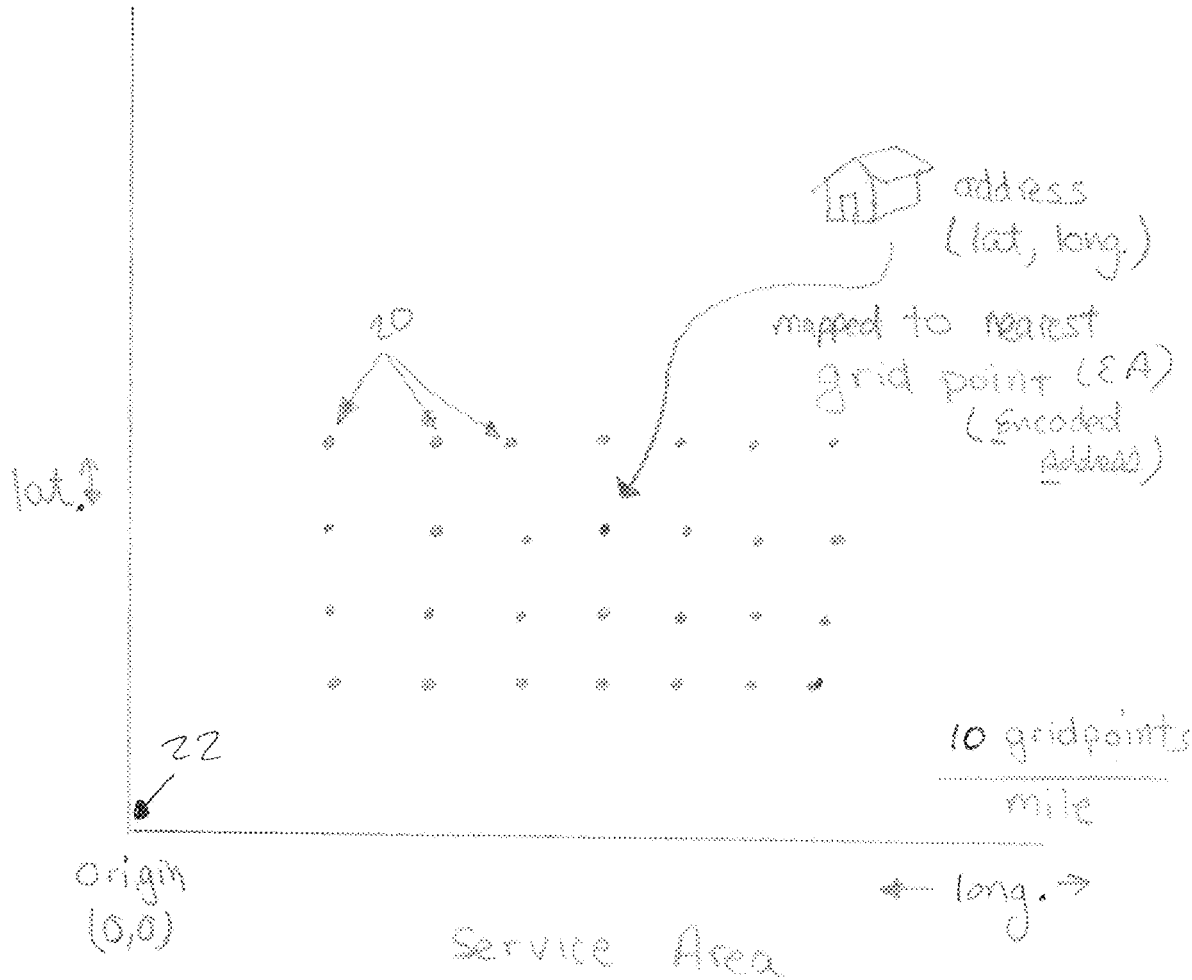
FIG. 2 illustrates a portion of a grid of uniform points in a service area to which the addresses of pick up and drop off locations are mapped in accordance with an embodiment of the disclosed technology.

FIG. 2 shows a number of grid points 20 in a Cartesian (x,y) coordinate space that covers a service area of a ride request system. In one embodiment, a reference grid point 22 is defined at the Southwest corner of the service area. A benefit of putting the reference point in the Southwest corner is that all other grid points have positive offsets with respect to the origin both in the x (longitudinal) direction and the y (latitude) direction. If the origin is defined at some other point, some offsets in the service area may be negative, which requires extra bits to represent in computer memory.

The grid points 20 are equally spaced at a fixed distance from each other in both the x and y directions. In one embodiment, adjacent grid points are defined as being 0.1 miles apart from one another in both x and y directions. This makes computation easy and provides travel time estimations that are as accurate as the techniques disclosed in the '676 patent. With the disclosed technology, each address of a requested trip is mapped to its nearest grid point 20. The grid points 20 that have been mapped to requested trip addresses are also referred to herein as encoded addresses ("EAs"). In one embodiment, an address is mapped to a single grid point by converting its longitude and latitude designation into x and y offset distances from the origin and rounding the offsets to a resolution that is equal to the resolution of the grid points per unit of distance (e.g. the number of grid points per mile or kilometer) in the service area. One technique for mapping an address to a grid point is described in detailed below.

Figure 3:
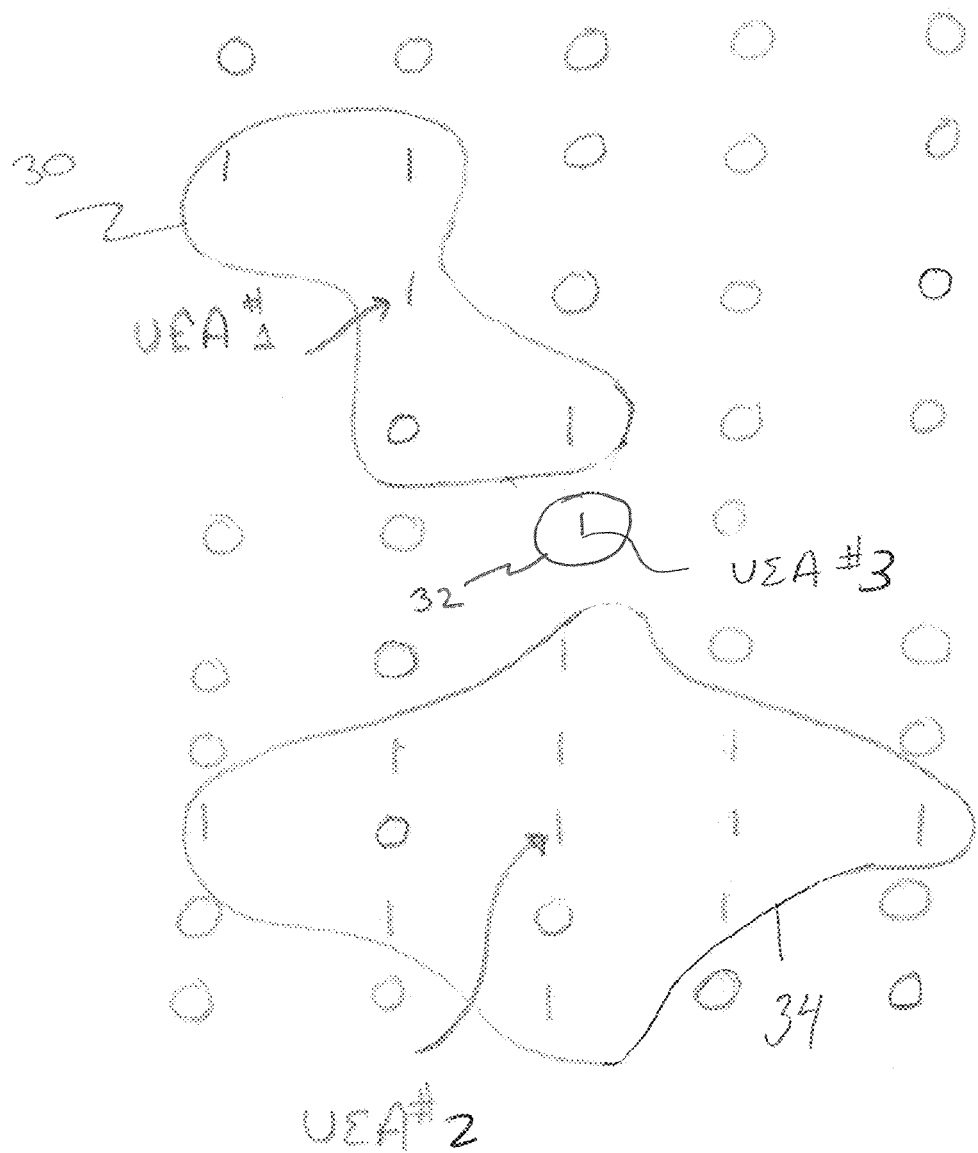
FIG. 3 illustrates a number of unique grid points that are associated with a set of one or more grid points (including themselves) that are both associated with an address of a previously requested trip and are within a predetermined distance of the unique grid point (the unique grid point is said to cover the set of one or more grid points)

FIG. 3 shows a cluster of a number of grid points in a service area. Some grid points are shown as 0's representing grid points that have not been mapped to a trip address and some grid points are shown as 1's representing grid points that have been previously mapped to a trip address (i.e. are encoded addresses). It is important to note that multiple trip addresses may be mapped to the same grid point if the addresses are located close enough in the service area. FIG. 3 shows groupings of grid points (indicated by the boundaries 30, 32, 34) where the grid point(s) (encoded addresses) inside a boundary are associated with a single unique grid point (also known as a unique encoded address "UEA") that is also inside the boundary. Each grid point or encoded address within a boundary is within a predetermined maximum distance from its associated unique encoded address. In one embodiment, the predetermined maximum distance is 0.2 miles (e.g. up to two grid points away in the x or y direction or one grid point away diagonally) from a unique encoded address). In the example shown, a unique encoded address #1 (UEA #1) in boundary 30 is associated with three other encoded addresses (not including itself). A unique encoded address #2 (UEA #2) in boundary 34 is associated with a group of 10 other encoded addresses (not including itself). A unique encoded address #3 (UEA #3) in boundary 32 is only associated with itself. The number of encoded addresses or grid points that can be associated with any unique encoded address is therefore dependent on the resolution of the grid points (e.g. number of grid points per mile) and the acceptable variance in estimated travel times.

Because each encoded address (EA) is within a predetermined distance of the associated unique encoded address (UEA), it is only necessary to store travel times between unique encoded addresses in order to estimate the travel times between any pair of encoded addresses. For example, if it is known that the expected travel time at 10 am between unique encoded address #1 and unique encoded address #2 is 12 minutes, then it can be assumed that the estimated travel time for any encoded address in the boundary 30 and any encoded address in the boundary 34 is also 12 minutes (within a margin of error required to travel the maximum predetermined distance such as 0.2 miles). As will be described, the travel time estimation system stores a record of estimated or measured travel times between unique encoded addresses at different times of the day and uses the estimated travel times between pairs of unique encoded addresses as estimates for the travel time between any encoded addresses that are mapped to the pair of unique encoded addresses.

The mapping of encoded addresses to unique encoded addresses is based on an historical analysis of previously requested trip requests. In one embodiment, all to and from encoded addresses of requested trips made within a past 6 month or one-year window are mapped to unique encoded addresses. It is likely that the same to and from encoded addresses will be used again in future ride requests so that the mapping can be used to estimate travel times for future ride requests. The mapping can be periodically updated, such as once a month, or more or less frequently depending on how often new unmapped addresses are received for trip requests. If a new address for a ride request is received that has not yet been mapped, such as a new home being built or a new clinic being opened, then the travel time estimation system can use existing methods such as the triangulation or Pythagorean methods to estimate the travel time for the new address.

Figure 4:
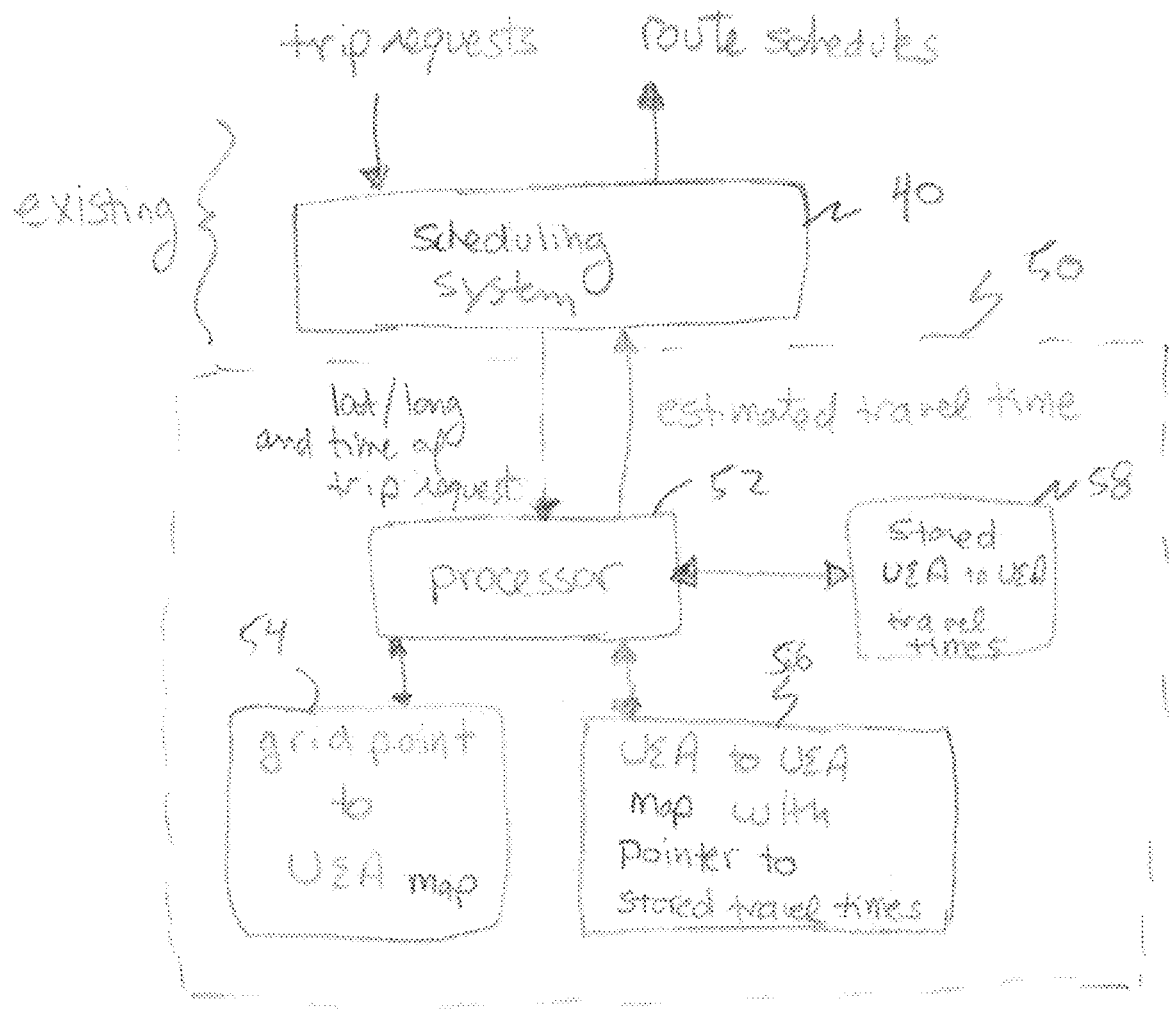
FIG. 4 is a block diagram of a travel time estimation system including maps and tables that are stored in electronic memories in accordance with an embodiment of the disclosed technology.

FIG. 4 is a block diagram of a system for determining estimated travel times between addresses in accordance with one embodiment of the disclosed technology. In this embodiment, a known scheduling system 40 receives ride requests such as by telephone or via an internet interface. Each ride request includes information such as a "to address" and a "from address" as well as a requested pick up or drop off time of service. Additional information can include if the rider is ambulatory or in a wheel chair, requires additional help etc. The scheduling system 40 interacts with a travel time estimation system 50 whose primary function is to receive address information and to return estimated travel times between addresses at a requested ride time. In one embodiment, the travel time estimation system 50 includes its own processor (CPU, DSP, graphics card or other programmable processor) 52. In another embodiment, the processor 52 is the same processor(s) used by the scheduling system 40 and the travel time estimation system 50 is a software module operated by the processor of the scheduling system 40. In another embodiment, the travel time estimation system 50 is its own computer system that is in electronic communication with the scheduling system 40. In either case, the processor 52 is configured to execute programmed logic or instructions stored in a non-transitory computer readable media or memory to read estimated travel times between unique encoded addresses from an electronic memory as will be discussed below. The processor 52 has associated volatile and non-volatile memory that are used to store and recall data from mappings of grid points/encoded addresses to unique encoded addresses (UEAs) 54 and records 56, 58 of estimated travel times between unique encoded addresses as will be discussed.

In the embodiment shown, the scheduling system 40 provides the travel time estimation system 50 with the latitude/longitude (or longitude/latitude) descriptions of a pair of addresses as well as a time of day when the travel time is to be estimated. The addresses need not be the beginning or end points of a trip request but can be for intermediate stops on a route schedule being considered. The particular addresses provided to the travel time estimation system 50 are determined by the logic of the scheduling system 40. For example, the distance between an address for requested ride at 9 am would not consider the distance to address to rides that are requested at 7 am. Similarly, the estimated travel time between an address for a ride beginning at 9 am would not be determined to an address for a trip beginning at 11 am if the maximum travel time for any rider is 1 hour etc. The travel time estimation system 50 returns an estimated travel time between pairs of unique encoded addresses associated with the provided longitudes/latitudes to the scheduling system 40.

In order to determine which grid point an address that is defined by its longitude/latitude maps to, the processor 52 executes instructions to determine offsets of the longitude/latitude compared to the longitude/latitude of a defined origin point of the service area. Consider the following example. An address is received having a given address (longitude, latitude) of (−73.94640, 40.58655) in degrees. First, the decimal points are moved by the processor 5 places to the right to convert the coordinates to integers, which speeds processing time. Next, the longitude/latitude of a Southwest corner of the service area that is defined as the origin (OX, OY) is recalled from memory and the offsets to the given address are determined in fractions of a degree by subtraction (30680, 8641). Next, the processor converts the offset from a degree representation to a distance representation (such as miles or kilometers). The factor used for the conversion depends on location of the longitude/latitude of the address on earth and the desired distance standard (e.g. miles or kilometers). In New York state where the example comes from, 0.01940 degrees longitude=1 mile and 0.01450 degrees latitude=1 mile. Therefore, the offset distance in miles is determined by dividing the offsets by the distance factors (30680/1940=15.814 miles) (8641/1450=5.959 miles).

These values are then converted by the processor to tenths of a mile by moving the decimal one place right. In one embodiment, the offsets are then truncated to the nearest tenth of a mile by rounding the last two digits of the offset (15.814=158 tenths of a mile longitude, 5.959=060 tenths of a mile latitude) Having the offsets measured in tenths of a mile is useful for a Cartesian grid whose grid points are defined as being 0.1 miles apart. See the table below.

| Given address (Longitude, Latitude) | (−7394640 | 4058655) |
|---|---|---|
| Address of Origin (OX, OY) | (−7425320 | 4050014) |
| Subtract to determine Offset | (30680 | 08641) |
| Convert to Distance (miles) | (15814 | 05959) |
| Round least-significant 2 digits (X, Y) | (158 | 060) |

For any address (longitude, latitude), the rounding of the least significant 2 digits maps the coordinates to the nearest grid point in the Cartesian coordinate space (X, Y) with a loss of precision of at most 0.050 miles. (i.e. 100 units=0.10 mile).

| Given sample in Cartesian units | 8850 | 8851 | 8852 | ... 8948 | 8949 |
|---|---|---|---|---|---|
| Round least significant 2 digits | 8900 | 8900 | 8900 | ... 8900 | 8900 |
| Precision loss (Units) | 50 | 49 | 48 | ... 48 | 49 units |
| Precision loss (Miles) | 0.050 | 0.049 | 0.048 | ... 0.048 | 0.049 miles |
| Representation (after rounding) | 89 | 89 | 89 | ... 89 | 89 |

With rounding, a 3-digit representation covers the range 000xx-999xx units in the Cartesian system (i.e. rounding out the 'xx'). At 1000 units per mile, the 3-digit representation covers 999xx/1000=100 miles. So, a 3-digit representation for the X-axis and for the Y-axis can cover a service area of 100 miles×100 miles. A test service area in the Northeast U.S. had an area of 30 miles×30 miles so a three-digit representation was more than enough to cover the service area. If X and Y are each limited to a 4-digit representation, (X, Y) can be encoded as an 8-digit integer that can still be stored in 4-bytes of computer memory.

The range of a 3-digit representation of X (or Y) is 000-999=100 miles. So, the 6-digit representation of addresses is sufficient for a service area of up to (100 miles by 100 miles). The range of a 4-digit representation of X (or Y) is 0000-9999=1000 miles. So, the 8-digit representation of addresses is sufficient for a service area of up to (1000 miles by 1000 miles).

With a 3-digit representation for X and a 3-digit representation for Y, the processor concatenates the 3-digit codes to represent (X, Y) an encoded address (EA) in a single integer (4-bytes of memory) to minimize computer memory storage.

Encode address (X, Y) (158 060)→158060

Note that all (Longitude, Latitude) addresses in the service area map into a discrete set of encoded addresses (EA), with loss of precision of at most 0.050 miles each. In practice, the processor creates a list of such encoded addresses (EAs) from the trip requests received in a previous time period. For example, at the test site in the Northeast U.S., in 1 week of service in which approximately 27,000 trips were requested per day, there were 24,697 encoded addresses (EAs) that represent all (Longitude, Latitude) stops in that week's schedules. Some trips were requested to the same destination and some trips were requested from the same address hence the reason that the number of encoded addresses is less than the total number addresses of the requested trips. As mentioned above, the mapping of encoded addresses to unique encoded addresses is periodically updated such as once a month, once every 6 months or more or less frequently to accommodate new users or new destinations etc.

Once the list of encoded addresses has been determined, the next step for the processor is to execute instructions to calculate a minimal set of unique encoded addresses (UEA) such that all encoded addresses (EAs) are within some predetermined maximum distance (e.g. 0.2 mile) of some unique encoded address (UEA). Estimated travel times between any pair of encoded addresses are then determined by recalling from memory a stored travel time that is estimated or measured between the associated unique encoded address pairs.

The processor is programmed to create and store in memory an "n-to-1" map (MAP-1) in memory that associates each encoded address (EA) with a unique encoded address (UEA) that is within the predetermined distance or "covers it". For test data from five days of trip request data in a site in the Northeast U.S., 24,697 encoded addresses (EA) were mapped to 3601 unique encoded addresses (UEAs) in MAP-1.

The processor then executes instructions to create and store in memory a second map (MAP-2) that references a travel time between each of the UEAs. As will be appreciated, the MAP-2 is n×n where n is the number of unique encoded addresses UEAs. The map MAP-2 is sparsely populated because trip requests for a given period of time do not usually include a trip from each UEA to every other UEA in the map. In one actual test, the MAP-2 was only 24% populated.

To further save on memory and improve processing speed, each populated cell in MAP-2 contains a pointer or index into a common memory storage where the travel time by period of day information is stored for lookup as information pairs (i.e. time period, travel time). MAP-2 defines a "1-to-1" map from each UEA pair (cell) to its lookup information in common memory storage.

FIG. 5 illustrates the structure of one implementation of MAP-2 and the common memory storage where the travel times between UEAs are recorded. In this example, it was determined that 5646 unique encoded addresses were needed to cover a dataset of encoded addresses. In a 32-bit computer system, if each cell of MAP-2 were defined to hold a record of travel times for each hour in a 24-hour period, the table could hold data for a maximum 13,377 UEAs (13,377×13,377×24=2^32). It is easily conceivable that a service area may need more than this number of UEAs. In addition, accessing a such a table would be very slow due to paging of memory requests. If a 64-bit computer were used, larger tables could be addressed but processing would still be slowed by the maximum memory size that can be read at once due to paging requests.

In one embodiment, the disclosed technology speeds processing by storing a pointer in the MAP-2 table (UEA to UEA) where the pointer points to a common storage that stores estimated travel times between UEA's by time of day. In some embodiments, delimiters are placed in the data to separate times recorded for different UEA pairs. In this example, the estimated travel time from UEA 2 to UEA 7 is indicated by the pointer "5" that points an entry for 10 am between these UEAs. The processor uses the pointer to access the correct location in memory to search for a trip hour that equals the hour of the requested trip time. If a match is found, the processor reads the estimated travel time from the memory. For example, if the requested trip time is 11:15 am, the processor reads the entries starting at position 5 until 11 am is found at entry #6 and reads and returns a value of 37 minutes. If delimiters are used then if no matching entry is found before the processor reads the delimiter, the processor returns a message that no entry is found and the processor of the travel time estimation system will have to use another method such as triangulation or the Pythagorean method to estimate the travel time at the requested trip time. In another embodiment, estimated or measured travel times are recorded for every hour of system operation for each UEA pair so that an estimated travel time will always be read from memory.

As will be appreciated, the disclosed technology achieves a speed increase over known methods of determining estimated travel times be eliminating the calculations previously required to identify which disk an address is located in and by replacing the calculations with a calculation to determine an offset of the address compared to an origin point, converting the offset into a distance and truncating the distance to a resolution of a grid point in a Cartesian coordinate system. A simple table look up then matches the grid point to a UEA for which travel times are stored. Processing speed is further increased by only storing a record of travel times estimated or recorded between UEAs and not having to define and accesses a data structure capable of holding all travel times for all possible UEA to UEA combinations.

The following is short synopsis of the steps performed by a processor to read an expected travel time between a pair of address at a pickup time T (address A1, address A2, pickup time T):

1. Encode A1 as $EA_1$.
2. Use MAP-1 to map $EA_1$ to its unique covering $UEA_1$.
3. Encode A2 as $EA_2$.
4. Use MAP-1 to map $EA_2$ to its unique covering $UEA_2$.
5. Use MAP-2 to map ($UEA_1$, $UEA_2$) to travel time lookup table.
6. Return travel time for time period T lies in.

Direct memory access using MAP-1 and MAP-2 replaces many, many calculations, resulting in travel time lookup that is over 16 times faster than those described in U.S. Pat. No. 10,094,676. The speed gain comes with a tradeoff of a maximum loss of precision in the encoding of 0.050 miles.

As discussed above, the processor is programmed to pick a minimal set of unique encoded addresses (UEAs) that cover all encoded addresses (EAs) of previously requested trips. This is greatly simplified by the choice of the Cartesian coordinate system where 1000 units along either the X or Y axis=1 mile. Rounding out the least significant 2 digits of each address's distance offset from the origin casts all EA's into a simplified Cartesian coordinate system where each simplified unit=100 units=100*0.001 miles=0.10 miles. Assuming a Triangulation method of calculating distance, we can use a distance matrix per reference EA:

| delY\delX | 0 | 1 | 2 | 3 |
|---|---|---|---|---|
| 3 | 0.300 | 0.400 | 0.500 | 0.600 |
| 2 | 0.200 | 0.300 | 0.400 | 0.500 |
| 1 | 0.100 | 0.200 | 0.300 | 0.400 |
| Ref EA | 0.000 | 0.100 | 0.200 | 0.300 |

Therefore, in a grid with points defined at 0.1 mile spacings, two EA's are within ¼ mile of each other if their 3-digit X-representations differ by 0, 1, or 2, (and the Y-representations stay constant) or their 3-digit Y-representations differ by 0, 1, or 2 (and the X-representations stay constant) or the X and Y representations both differ by no more than 1. This ensures that the maximum distance between 2 EA's is 0.200 miles (Distance Matrix)+0.050 miles (maximum loss of precision from rounding the least significant 2 digits). The techniques described herein therefore have the same ¼ mile accuracy as the techniques described in the '676 patent.

As discussed above, the processor is programmed to pick a set of unique encoded addresses (UEAs) such that all encoded addresses (EAs) of previously requested trips are within 0.2 mile of some unique encoded address (UEA). The fewer UEA's, the fewer UEA pairs that are needed to store estimated travel times. A reduction of 1000 UEA's represents up to a reduction of 1000×1000=1,000,000 UEA pairs for travel time service, impacting computer memory storage and service access speed.

Figures 6A, 6B:
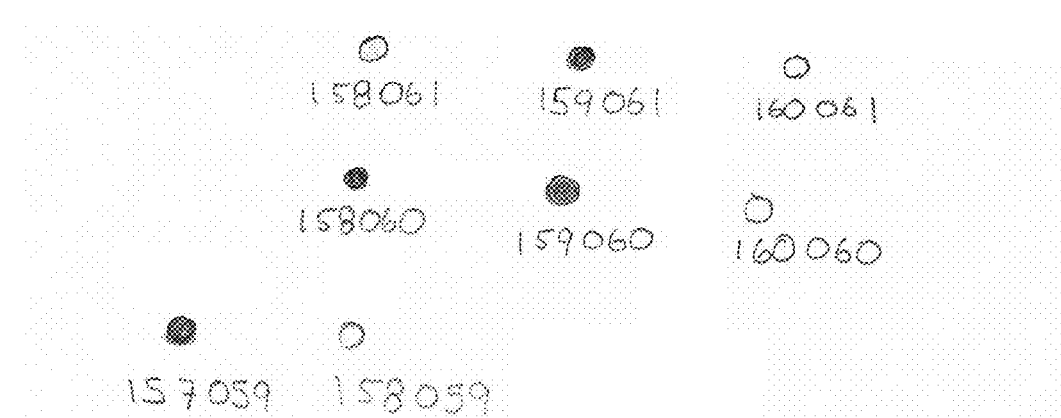
FIGS. 6A and 6B illustrate a number of encoded addresses (EAs) and a data structure that stores a record of which EAs are within a predetermined distance of each other.

The following pseudocode describes three different techniques that a programmed processor can use to pick a set of UEA's that cover all the EAs in a data set. The first step is for the processor to determine which encoded addresses (EAs) "cover" one another or are within the predetermined distance (e.g. 0.2 miles) of each other. FIG. 6A shows a group of encoded addresses with their concatenated address codes. Those grid points shown with the solid dot correspond to an encoded address of a previously requested trip. The grid points shown as hollow dots or circles are not associated with a previously requested trip. FIG. 6B shows a table created and stored in memory by the processor to store a record of which encoded addresses cover one another in accordance with one embodiment of the technology. In this embodiment, the address codes are sorted from smallest to largest and each address is tested to determine if there is another encoded address up to 2 grid points away in the X or Y direction or up to 1 grid point away diagonally. Testing in the vertical, horizontal and diagonal directions can be done by breaking the address codes into the 3-digit X and Y components and then adding or subtracting to the 3-digit components. A table or 2-dimensional array stores the record for the pattern shown in FIG. 6A where a 1 indicates an encoded address is covered and a 0 indicates an encoded address is not covered. In this embodiment, each encoded address covers itself. The table of which encoded addresses covers which other encoded address(es) is used when determining the unique encodes addresses (UEAs) as will be discussed below.

The following pseudo-code shows one embodiment of steps performed by a processor to determine which encoded addresses cover which other encoded addresses.

Initialize a matrix EAcoverEA[all EA's][all EA's] to value '0' (binary). This indicates that no EA is yet "covered".

Per EApair ($EA_1$, $EA_2$) in the set of EA's, if their 3-digit X-representations differ by 0, 1, or 2 and the Y-representations are constant, or their 3-digit Y-representations differ by 0, 1, or 2 and their X-representations are constant or their X and Y representations differ by no more than one, then set EAcoverEA[$EA_1$][$EA_2$] to value to '1', and EAcoverEA[$EA_2$][$EA_1$] to value to '1'. If $EA_1$ is selected as an UEA, it can cover $EA_2$, and vice-versa. The EA's are sorted in ascending order by their 6-digit code. Per $EA_1$, surrounding EAs are considered and stopped when the 3-digit X or Y representation differs by more than 2 from the X, Y-representation of $EA_1$, since no father out $EA_2$ can be covered by $EA_1$ if it is to be within the predetermined distance of 0.2 miles.

The following pseudo-code explains three different methods of determining a set of unique encoded address that are within a predetermined distance of other encoded addresses and include all the encoded addresses in a data set.

Process 1—"Outside In"—On a service area map of EA's, work from farthest out towards center of service area in picking UEA's from EA's. The processor is programmed is to iteratively pick an "uncovered" $EA_X$ as an UEA, and mark all $EA_Y$ that $EA_X$ "covers" as "covered", until no "uncovered" EA remains. The set of UEA's then "covers" the set of all EA's.

1. Identify the service area CENTER=(mid-X, mid-Y) in the EA Cartesian system.
2. Initialize an array EA_pUEA [all EA's] to value '0'-per EA, pointer to the UEA that covers it.
3. Sort the set of EA's by distance from CENTER in descending order.
4. Iterate through the EA's in descending order:
   i. If EA_pUEA [$EA_X$]='0', it is not covered, so select $EA_X$ as an UEA and set EA_pUEA [$EA_X$]=$EA_X$.
   ii. Use EAcoverEA to identify each $EA_Y$ covered by $EA_X$, and set EA_pUEA [$EA_Y$]=$EA_X$.
5. EA_pUEA represents an n-to-1 MAP-1 of each EA to its UEA.
6. If EA_pUEA [$EA_X$] equals $EA_X$ (i.e. $EA_X$ covers itself), $EA_X$ is an UEA.

Process 2—"Cover Count". In this embodiment, the processor is programmed to iteratively pick an "uncovered" $EA_X$ as an UEA, and mark all $EA_Y$ that $EA_X$ "covers" as "covered", until no "uncovered" EA remains. The set of UEA's then "covers" the set of all EA's. In this embodiment, the processor is programmed to pick as UEA's those EA's that have the most covering count of other EA's (i.e. "covers" the most "uncovered" EA's). The covering count of EA's that are not yet covered can be updated after each UEA picked.

1. Initialize an array EAcoverct[all EA's] to value '0'. This indicates that no EA yet "covers" any other EA.
2. In this embodiment, as the matrix EAcoverEA described above is being filled in, the processor keeps a count of how many nearby EAs a particular EA covers by incrementing an array EAcoverct[$EA_1$] to record a count of the number of EA's that $EA_1$ covers and incrementing the array EAcoverct[$EA_2$] to record a count of the number of EA's that $EA_2$ covers. Initialize an array of possible unique encoded addresses EA_pUEA [all EA's] to value '0'.
3. Iterate until no uncovered EA is left:
   i. For all uncovered EA's remaining, pick $EA_X$ with largest EAcoverct as an UEA and set EA_pUEA [$EA_X$]=$EA_X$.
   ii. Use the matrix EAcoverEA to identify each $EA_Y$ covered by $EA_X$, and set EA_pUEA [$EA_Y$]=$EA_X$.
   iii. Update EAcoverct to reflect that each $EA_Y$ covered by $EA_X$ is no longer "uncovered", by decrementing EAcoverct of each uncovered EA that could have covered $EA_Y$.
4. EA_pUEA represents an n-to-1 MAP-1 of each EA to its UEA.
5. If EA_pUEA [$EA_X$] equals $EA_X$ (i.e. $EA_X$ covers itself), $EA_X$ is an UEA.

Process 3—"Recursively build Islands of EA's and Pick UEA's per Island". In this embodiment, the processor is programmed, per Island, to iteratively pick an "uncovered" $EA_X$ as an UEA, and mark all $EA_Y$ that $EA_X$ "covers" as "covered", until no "uncovered" EA remains. The set of UEA's then "covers" the set of all EA's in that Island. In this embodiment, the processor is programmed to use a recursive function to identify islands of EA's in a service area map of EA's as independent subproblems. Then for island by island, the processor is programmed to pick UEA's recursively.

1. Initialize an array EA_pIsland[all EA's] to value '0'. This indicates that no EA has yet been assigned to an Island.
2. Initialize ISLANDct to value '0'.
3. Recurse until all EA's have been committed to an island:
   i. Find next $EA_X$ that is uncommitted to any Island.
   ii. Increment ISLANDct, and set EA_pIsland[$EA_X$] to value ISLANDct.
   iii. Call Grow_Island($EA_X$, ISLANDct).
      1. Using EAcoverEA, for each EX-y that $EA_X$ covers, set EA_pIsland[$EA_Y$] to value ISLANDct.
      2. Call Grow_Island($EA_Y$, ISLANDct) recursively.
      3. Recursion terminates when $EA_Y$ does not cover any other EA.
4. Recurse per ISLANDct as an independent subproblems, until all Island EA's have been assigned to an UEA. This is applying Process 2 ("Cover Count") above to each independent Island, one by one. Per ISLANDct Z:
   i. Put all EA's with EA_pIsland=Z in array ISET.
   ii. Fill matrix eacoverea for EA's in ISET. This is the same as EAcoverEA for Island Z—eacoverea [all Island Z EA's] [all Island Z EA's].
   iii. Fill array eacoverct for EA's in ISET. This is the same as EAcoverctEA for Island Z-eacoverct [all Island Z EA's].
   iv. Call Cover_Island(ISET, eacoverea, eacoverct)

1. Pick EA with highest eacoverct as UEA and set EA_pUEA [EA$_X$]=EA$_X$
2. Use eacoverea to identify each EA$_Y$ covered by EA$_X$, and set EA_pUEA [EA$_Y$]=EA$_X$.
3. Update ISET, eacoverea, and eacoverct to remove EA$_X$ and all EA$_Y$ covered by EA$_X$.
4. Call Cover_Island(ISET, eacoverea, eacoverct).
5. Recursion terminates when EA$_Y$ does not cover any other EA.

Once the UEAs have been determined by some method, the processor is programmed to create a map (MAP-2) to identify those UEA pairs that are needed for the paratransit demand-response service for a site. Not all UEA pairs are needed. Schedules are built by picking candidate UEA pairs as adjacent stops on a manifest. By recording all requests made to the travel time service in the course of building schedules, the total count of useful travel time service requests is approximated. In the test site in the Northeast U.S., this count varies between 140,000,000 to over 200,000,000 daily for scheduling over 27,000 Trips.

1. Initialize a matrix UEAtoUEA[all UEA][all UEA] [single entry for all time periods] to value '0'. In one embodiment, the single entry is a 24-bit value where each bit represents an hour of the day. In this way, the processor is programmed to look at each bit to determine if a travel time for that hour is needed to be stored (using a 24-bit value to determine if a travel time for an hour is stored in memory is an alternative, more memory-efficient technique to using delimiters per UEA pair (shown in FIG. 5); in use, for a request for travel time for an UEA pair at hour H, if the bit for the requested hour H has value '0', there is no need to follow the pointer to the common memory at all).
2. Process all travel time service requests from a past period such as 1-year of site schedules—(Longitude-1, Latitude-1, Longitude-2, Latitude-2, Time T).
   i. Convert (Longitude-1, Latitude-1) to EA$_1$. Use MAP-1 to set UEA$_1$ for EA$_1$.
   ii. Convert (Longitude-2, Latitude-2) to EA$_2$. Use MAP-1 to set UEA$_2$ for EA$_2$.
   iii. Map Time T into time period (e.g. per hour from 4:00 to 24:00).
   iv. Set UEAtoUEA[UEA$_1$][UEA$_2$][period] to value '1'.
3. For two common memory arrays of ATP_period and ATP_traveltime, initialize a pointer pATP to the last occupied element—i.e. initialize pATP to value '0'.
4. For (ueal=1; ueal<=ctUEA; ueal++) for (uea2=1; uea2<=ctUEA; uea2++) for (period=4; period<=24; period++) if (UEAtoUEA [uea1][uea2][period]==1):
   i. Increment pATP
   ii. Set ATP_period [pATP] to value period.
   iii. Set ATP_traveltime [pATP] to the travel time. The travel time can be initialized by using a Triangulation/Pythagorean method or a GIS method, and programmatically updated periodically by mining the GPS data from service vehicles as they execute the schedules.

The following table illustrates how well each of the above described methods does in defining a set of UEAs that cover all requested EAs. Count of UEA's to cover all EA's

| | EA's | "Outside In" | "Cover Count" | "Recursively . . ." |
|---|---|---|---|---|
| EA Set 1 | 13,103 | 6,633 | 5,646 | 5,275 |
| EA Set 2 | 13,842 | 6,820 | 5,772 | 5,334 |
| EA Set 3 | 14,329 | 7,022 | 5,956 | 5,513 |

-continued

| | EA's | "Outside In" | "Cover Count" | "Recursively . . ." |
|---|---|---|---|---|
| EA Set 4 | 14,437 | 7,024 | 5,960 | 5,523 |
| EA Set 5 | 14,013 | 6,895 | 5,820 | 5,387 |

Recursively partitioning EA's into Islands as independent subproblems, and selecting UEA's per subproblem produces the smallest set of UEA's to cover all EA's. This saves computer storage and speeds up access to travel time service.

Runtime Trials. The following statistics were collected by passing a common file of 2,286,977 trip requests to a travel time estimation system that uses triangulation, a travel time estimation system using a processor that is programmed with the methods disclosed in the '676 patent and to a travel time estimation system using a processor that is programmed to execute the techniques described herein. Each request is formatted as (from-address (long/lat), to-address (long/lat), pickup time). There were 10 runs made through the same input data set to average out any computational noise from background operating system processes. The table shows the number of estimated travel time requests that can be handled for each second of processing time. The trials were conducted on an LG Gram Laptop with 16 Gigabytes of installed RAM running an Intel® Core™ i7-8565U CPU @ 1.80 GHz. As can be seen from the table below, the disclosed techniques operation is 16 times faster than the methods described in the '676 patent thereby reducing the time required for a processor to determine ride schedules from a set of trip requests.

| | Triangulation | '676 patent | Disclosed Techniques |
|---|---|---|---|
| Run 1 | 695,341/sec | 811,848/sec | 13,143,544/sec |
| Run 2 | 697,249/sec | 806,409/sec | 13,296,383/sec |
| Run 3 | 705,857/sec | 791,068/sec | 13,068,444/sec |
| Run 4 | 710,462/sec | 814,741/sec | 12,429,222/sec |
| Run 5 | 682,272/sec | 786,714/sec | 13,219,513/sec |
| Run 6 | 706,293/sec | 803,012/sec | 12,920,788/sec |
| Run 7 | 701,957/sec | 809,263/sec | 12,705,423/sec |
| Run 8 | 702,389/sec | 792,438/sec | 12,848,187/sec |
| Run 9 | 681,662/sec | 805,274/sec | 12,705,440/sec |
| Run 10 | 706,293/sec | 816,778/sec | 12,497,136/sec |
| SPEED (average) | 698,978/sec | 803,755/sec | 12,883,408/sec |
| SPEED GAIN | | 15% faster vs Triangulation | 1603% faster vs ¼ mile Disk '676 |

From the foregoing, it will be appreciated that specific embodiments of the invention have been described herein for purposes of illustration, but that various modifications may be made without deviating from the scope of the disclosed technology. For example, the grid pattern used defines grid points at 0.1 miles apart. This could be increased (e.g. 0.2 miles apart) with a corresponding loss of accuracy. Similarly, the grid pattern could be made smaller (e.g. 0.05 miles apart) with a corresponding increase in processing time and memory storage requirements. Finally, the disclosed technology is not limited to paratransit ride scheduling systems. The disclosed techniques could be used with any system that must estimate travel times between locations such as route navigation systems in cars etc. Therefore, the scope of the disclosed technology is to be limited only by the following claims.

I claim:

1. A travel time estimation system for estimating a time required to travel between a pair of addresses at a desired travel time, comprising:
    one or more memories that store program instructions and data;
    a processor that is configured to execute program instructions in order to perform the steps of:
        receiving a current trip request with the pair of addresses and the desired travel time;
        converting the pair of received addresses into a pair of grid points (Encoded Addresses—EAs) in an array of regularly spaced grid points in a Cartesian coordinate system;
        for each EA of the current trip request, reading from an electronic memory that stores a record of an associated unique covering grid point (Unique Encoded Address—UEA) for the EA, where the unique covering grid point (UEA) is selected from a set of UEAs that have been determined from EAs of previous trip requests such that each EA of the previous trip requests is associated with a single UEA and each UEA is located no more than a predetermined maximum distance away from the associated EA of the previous trip requests in the Cartesian coordinate system;
        reading an estimated travel time from the electronic memory that stores a record of one or more estimated travel times for a pair of UEAs that are associated with the EAs of the current trip request; and
        returning the estimated travel time between the UEAs at the desired travel time as the time required to travel between the pair of addresses of the current trip request at the desired travel time.

2. The travel time estimation system of claim 1, wherein the program instructions are executed by the processor to convert an address of the pair of received addresses into a grid point (EA) by:
    reading a longitude/latitude of the address;
    calculating offsets of the longitude/latitude compared with a longitude/latitude of an origin in a service area;
    converting the offsets into X and Y distance measurements;
    rounding the X and Y distance measurements to a resolution that is equal to a resolution of a number of grid points per unit of distance in the Cartesian coordinate system; and
    using the rounded X and Y distance measurements to identify the grid point (EA) associated with the address.

3. The travel time estimation system of claim 2, wherein the processor is configured to execute instructions to concatenate the rounded X and Y distance measurements as a code identifying the grid point (EA) in the Cartesian coordinate system.

4. The travel time estimation system of claim 3, wherein the processor is configured to execute instructions to determine if a pair of encoded addresses (EAs) are within the predetermined maximum distance of each other by comparing the rounded X and Y distance measurements that form the codes of the grid points associated with the pair of EAs.

5. The travel time estimation system of claim 1, wherein the predetermined maximum distance is less than or equal to 0.25 miles.

6. The travel time estimation system of claim 1, wherein the processor is configured to execute instructions to recursively analyze a set of EAs to determine a set of unique encoded addresses (UEAs) such that each EA in the set is associated with a single UEA and each EA in the set is no more than the predetermined maximum distance away from its associated UEA in the Cartesian coordinate system.

7. A method performed by a processor in a travel time estimation system to estimate a time required to travel between a from-address and a to-address at a desired travel time, comprising:
    receiving a current trip request that includes the from-address and the to-address and the desired travel time;
    associating the from-address and the to-address with a pair of grid points (Encoded Addresses—EAs) in an array of regularly spaced grid points in a Cartesian coordinate system;
    for the EA associated with the from-address and the EA associated with the to-address, reading from an electronic memory that stores a record of a unique covering grid point (Unique Encoded Address—UEA) for the EAs, where the unique covering grid points (UEAs) are determined from a set of EAs of previously requested trips such that each EA of the previously requested trips is associated with a single UEA and is located no more than a predetermined maximum distance away from the associated UEA in the Cartesian coordinate system;
    reading an estimated travel time between the pair of UEAs that are associated with the EAs of the current trip request from the electronic memory; and
    returning the estimated travel time between the pair of UEAs that is read from the electronic memory as the estimated travel time between the from-address and the to-address.

8. The method of claim 7, wherein the from-address and to-address are associated with a grid point (EA) by:
    reading a longitude/latitude of the addresses;
    calculating offsets of the longitude/latitude compared with a longitude/latitude of an origin in a service area;
    converting the offsets into X and Y distance measurements;
    rounding the X and Y distance measurements to a resolution that is equal to a resolution of a number of grid points per unit of distance in the Cartesian coordinate system; and
    using the rounded X and Y distance measurements to identify the grid points (EAs) associated with the from-address and the to-address.

9. A travel time estimation system for estimating a time required to travel between a from-address and a to-address at a desired travel time, comprising:
    a memory that stores program instructions and data;
    a processor that is configured to execute program instructions in order to perform the steps of:
        receiving latitude and longitude information for the from-address and the to-address and the desired travel time;
        from the latitude and longitude information, identifying a grid point on an array of regularly spaced grid points in a Cartesian coordinate system for each of the from-address and the to-address;
        accessing a record stored in memory to read a covering grid point that is associated with the grid point identified for the from-address and a covering grid point that is associated with the to-address, wherein the covering grid points are determined from a set of grid points for previous trip requests such that each grid point of the previous trip requests is associated with a single covering grid point and is located no more than a predetermined maximum distance away from the associated covering grid point in the Cartesian coordinate system;

accessing a record stored in memory to read a travel time between the covering grid points associated with the from-address and the to-address at the desired travel time; and returning the travel time between the covering grid points that was the read from memory as the estimated time required to travel between the from-address and the to-address at the desired travel time.

\* \* \* \* \*